UNITED STATES PATENT OFFICE.

ROBERT A. McCULLOUGH, OF MILWAUKEE, WISCONSIN, ASSIGNOR TO MARY T. McCULLOUGH, OF SAME PLACE.

PROCESS OF MAKING SOAP.

SPECIFICATION forming part of Letters Patent No. 381,503, dated April 17, 1888.

Application filed January 17, 1888. Serial No. 261,003. (No specimens.)

*To all whom it may concern:*

Be it known that I, ROBERT A. McCULLOUGH, of Milwaukee, in the county of Milwaukee, and in the State of Wisconsin, have invented certain new and useful Improvements in the Process of Making Soap; and I do hereby declare that the following is a full, clear, and exact description thereof.

My invention relates to the manufacture of soap; and it consists in a certain process, as hereinafter set forth, and pointed out in the claim.

In carrying out my process in order to make, say, one thousand pounds of soap, I employ about two hundred and ten pounds of cocoanut-oil and an equal quantity of tallow and two hundred and fifty pounds of liquefied caustic soda at 32° Baumé, and proceed as follows: Into an open kettle I put five gallons of water and add thirty-five pounds of borax thereto, and next add thereto half the above-named quantity of the liquefied lye—say one hundred and twenty-five pounds—and half the quantity of cocoanut-oil and tallow—say one hundred and five pounds of each—and bring the temperature up to a point from about 190° to about 240° Fahrenheit, according to the condition of the fatty acids employed. At this stage I preferably introduce about forty pounds of silicate of soda mixed with about ten pounds of dissolved starch (though this may be introduced later, as hereinafter stated) into the kettle, and rapidly agitate the mass for a few minutes until the mass becomes homogeneous. The balance of the cocoanut-oil and tallow (one hundred and five pounds of each) is heated to about 125° to 150° Fahrenheit and run into an open tank, and the balance (one hundred and twenty-five pounds) of the liquid lye added thereto and mixed therewith, and to this mass is then added the first-named mass, and the whole agitated until the two masses are thoroughly mixed, and at this stage, if the described mixture of silicate of soda and dissolved starch has not been previously added to the first mixture, it may now be added to the combined mass, which remains in the tank for from thirty minutes to an hour, with occasional agitation, when the whole mass will become thoroughly saponified and the soap is made and ready to be run into frames.

While I have given such proportions as I have found will produce good results, I do not limit myself thereto, as I may use less or more of the cocoanut-oil and increase or decrease the amount of tallow correspondingly.

Having thus described my invention, what I claim, and desire to secure by Letters Patent, is—

The hereinbefore-named process of making soap, consisting in adding borax to water contained in an open kettle, next adding liquefied caustic soda, cocoanut-oil, and tallow thereto, and heating the same to a point from about 190° to 240° Fahrenheit, and rapidly agitating the mass until it becomes homogeneous, next melting a similar quantity of cocoanut-oil and tallow and running it into an open tank and adding to it about the same quantity of liquefied caustic soda as before, and thoroughly mixing this mass, and then mixing the two described masses together with a mixture of silicate of soda and dissolved starch, and letting the whole remain for from half an hour to an hour in the tank, with occasional agitation until the whole mass is thoroughly saponified.

In testimony that I claim the foregoing I have hereunto set my hand, at Milwaukee, in the county of Milwaukee and State of Wisconsin, in the presence of two witnesses.

ROBT. A. McCULLOUGH.

Witnesses:
H. G. UNDERWOOD,
N. E. OLIPHANT.